United States Patent
Zaldumbide et al.

(10) Patent No.: US 9,827,831 B1
(45) Date of Patent: Nov. 28, 2017

(54) AIR FRESHENER FOR AN AUTOMOBILE

(71) Applicants: Luis Alfonso Zaldumbide, Downey, CA (US); Nicole Hoskinson, Downey, CA (US)

(72) Inventors: Luis Alfonso Zaldumbide, Downey, CA (US); Nicole Hoskinson, Downey, CA (US)

(*) Notice: Subject to any disclaimer, the term of this patent is extended or adjusted under 35 U.S.C. 154(b) by 91 days.

(21) Appl. No.: 15/051,957

(22) Filed: Feb. 24, 2016

(51) Int. Cl.
*B01F 3/04* (2006.01)
*B60H 3/00* (2006.01)

(52) U.S. Cl.
CPC .............. *B60H 3/0028* (2013.01); *B01F 3/04* (2013.01); *B60H 2003/0042* (2013.01)

(58) Field of Classification Search
CPC .......... B01F 3/04; B60H 3/00; B60H 3/0028; B60H 2003/0042
USPC .............. 261/26, 30, 118; 422/124; 454/157
See application file for complete search history.

(56) References Cited

U.S. PATENT DOCUMENTS

| | | | |
|---|---|---|---|
| 5,078,046 A | 1/1992 | Mascolo et al. | |
| 5,833,929 A | 11/1998 | Watson et al. | |
| 6,032,930 A | 3/2000 | Calino | |
| 7,097,555 B2* | 8/2006 | Bourbon | B60H 1/34 422/123 |
| 2017/0129313 A1* | 5/2017 | Avendano Arenas | B60H 3/0028 |

* cited by examiner

*Primary Examiner* — Robert A Hopkins
(74) *Attorney, Agent, or Firm* — Stevenson IP, LLC

(57) ABSTRACT

An air freshener for an automobile including a housing unit attached to an underside of a dashboard air vent. A canister is removably disposed within an opening disposed in the housing unit. An outlet tube has a first end in fluid communication with the canister. A pair of apertures is disposed through a bottom surface of the dashboard air vent. A right aperture and a left aperture of the pair of apertures is in fluid communication with a second end of the outlet tube and a third end of the outlet tube, respectively. Each of a right control valve and a left control valve of a pair of control valves is disposed on the second end of the outlet tube and the third end of the outlet tube, respectively. The pair of control valves is configured to release a quantity of liquid in the canister through the pair of apertures.

2 Claims, 4 Drawing Sheets

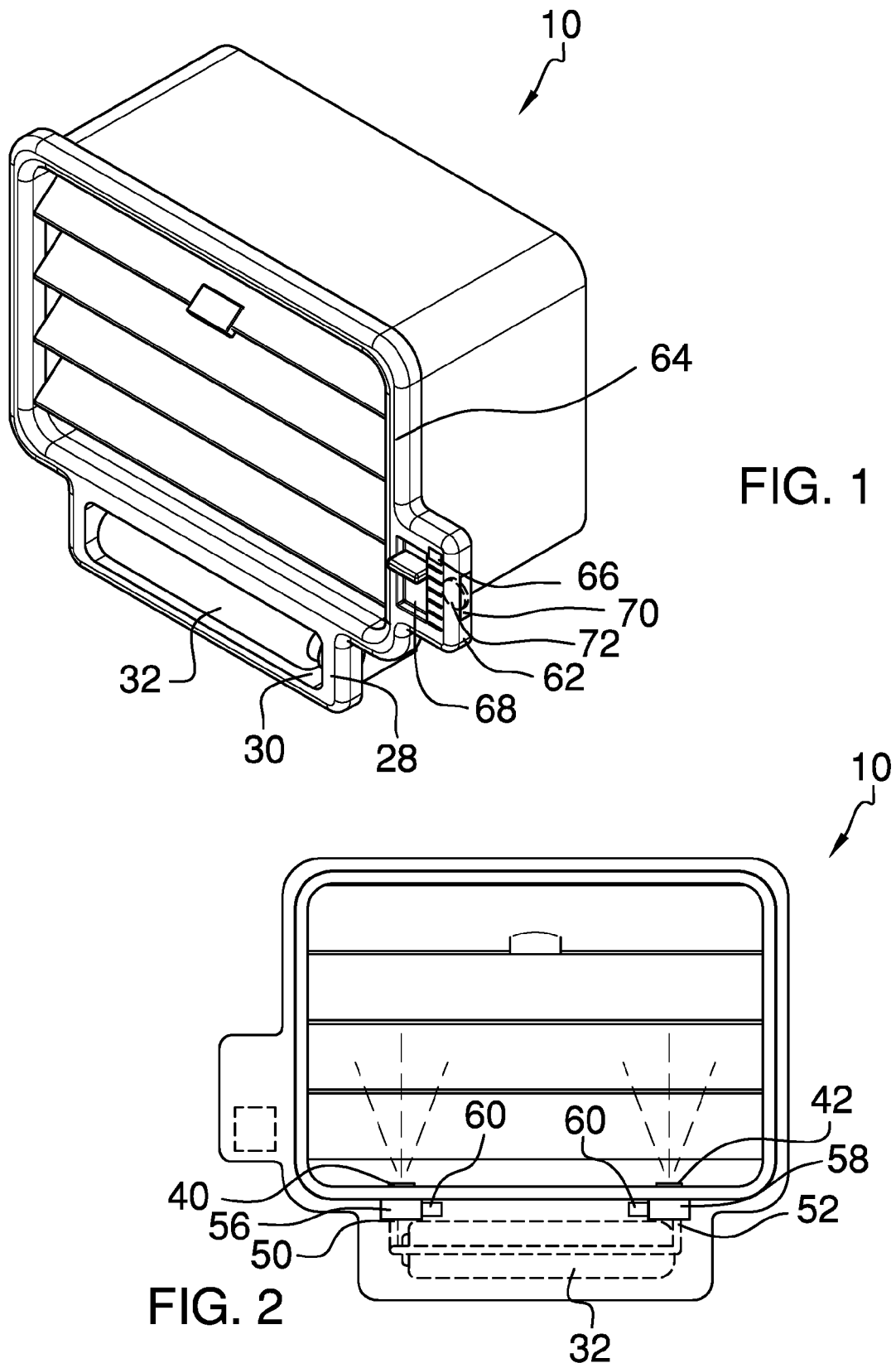

AIR FRESHENER FOR AN AUTOMOBILE

BACKGROUND OF THE INVENTION

Various types of air fresheners are known in the prior art. However, what has been needed is an air freshener for an automobile including a housing unit attached to an underside of a dashboard air vent. What has been further needed is a canister removably disposed within an opening disposed in the housing unit and an outlet tube having a first end in fluid communication with the canister. A pair of apertures is disposed through a bottom surface of the dashboard air vent, with a right aperture and a left aperture of the pair of apertures in fluid communication with a second end of the outlet tube and a third end of the outlet tube, respectively. Lastly, what has been needed is for each of a right control valve and a left control valve of a pair of control valves to be disposed on the second end of the outlet tube and the third end of the outlet tube, respectively. An activation control and a timer control is configured to activate the pair of control valves to release a quantity of liquid in the canister through each of the pair of apertures, with the timer control activating the pair of control valves at one of a plurality of time intervals selected by a user. The air freshener for an automobile thus allows the user to better control the dispensing of air freshener as compared with other automobile air fresheners that continuously release air freshener into the automobile.

FIELD OF THE INVENTION

The present invention relates to air fresheners, and more particularly, to an air freshener for an automobile.

SUMMARY OF THE INVENTION

The general purpose of the present air freshener for an automobile, described subsequently in greater detail, is to provide an air freshener which has many novel features that result in an air freshener for an automobile which is not anticipated, rendered obvious, suggested, or even implied by prior art, either alone or in combination thereof.

To accomplish this, the present air freshener for an automobile includes a housing unit attached to an underside of a dashboard air vent of an automobile. The housing unit has a back surface, a front surface, and a rectangular opening disposed in the housing unit from the front surface to proximal the back surface. A canister is removably disposed within the opening of the housing unit, and an outlet tube has a first end in fluid communication with the canister. The canister is configured to store a liquid air freshener. A pair of apertures includes a right aperture and a left aperture. Each of the right aperture and the left aperture is disposed through a bottom surface of the dashboard air vent proximal a right side of the dashboard air vent and a left side of the dashboard air vent, respectively. Each of the right aperture and the left aperture is in fluid communication with a second end of the outlet tube and a third end of the outlet tube, respectively. A pair of control valves includes a right control valve and a left control valve. Each of the right control valve and the left control valve is in operational communication with an actuator and disposed on the second end of the outlet tube and the third end of the outlet tube, respectively.

The air freshener for an automobile further includes a control unit attached to a continuous front edge of the dashboard air vent of the automobile. The control unit has an activation control, a timer control, and a battery compartment having a battery removably disposed within the battery compartment. The activation control is configured to activate the pair of control valves to release a quantity of liquid in the canister through each of the pair of apertures. The timer control is configured to activate the pair of control valves at one of a plurality of time intervals selected by a user. The pair of control valves, the control unit, the activation control, the timer control, and the battery are in operational communication with each other. Unlike other automobile air fresheners, which typically continuously release an air freshener and decrease in effectiveness over time, the timer control ensures that the air freshener is only released in preselected time intervals, thus extending both the canister's use and the effectiveness of the air freshener over longer periods of time.

The air freshener for an automobile optionally includes a motorized fan disposed within the dashboard air vent proximal the pair of apertures. The motorized fan is in operational communication with the control unit, the activation control, the timer control, and the battery. The motorized fan is configured to activate when the pair of control valves is activated by one of the activation control and the timer control. The optional motorized fan ensures that the liquid of the air freshener is better dispersed as it leaves the dashboard air vent of the automobile.

Thus has been broadly outlined the more important features of the present air freshener for an automobile so that the detailed description thereof that follows may be better understood and in order that the present contribution to the art may be better appreciated.

BRIEF DESCRIPTION OF THE DRAWINGS

Figures
FIG. 1 is a front isometric view.
FIG. 2 is a rear elevation view.

DETAILED DESCRIPTION OF THE DRAWINGS

Figure 3:
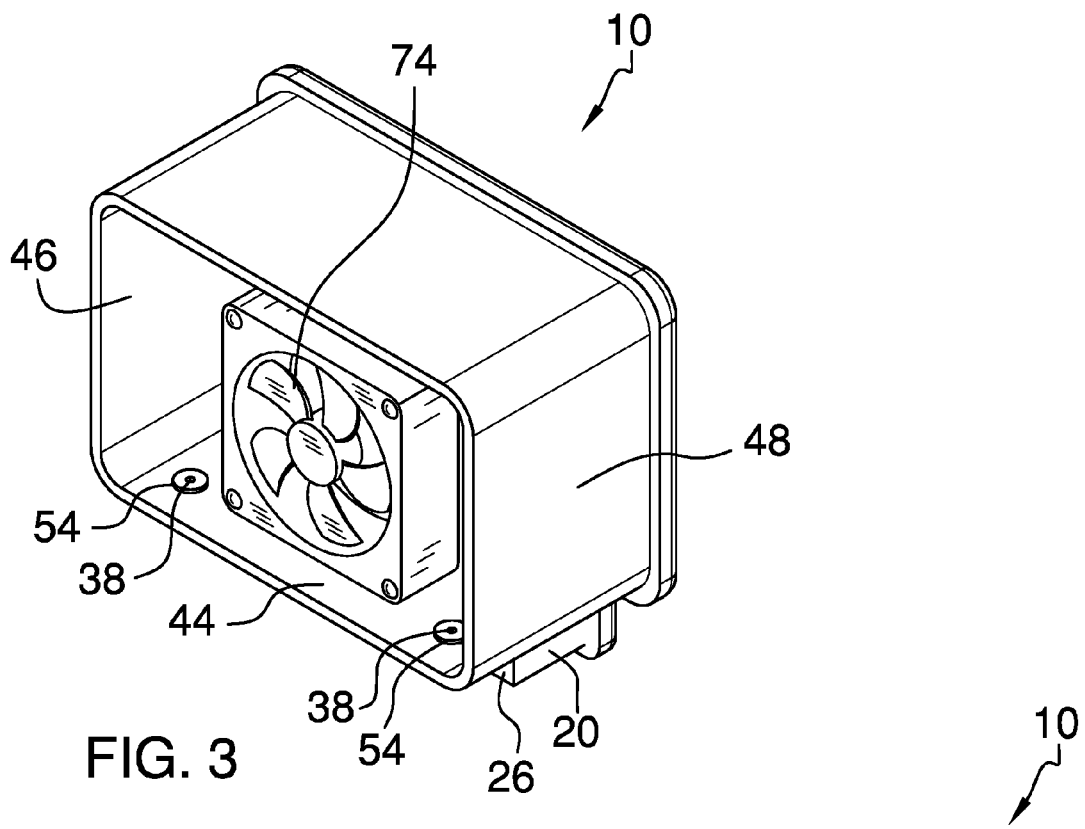
FIG. 3 is a rear isometric view.
Figure 4:
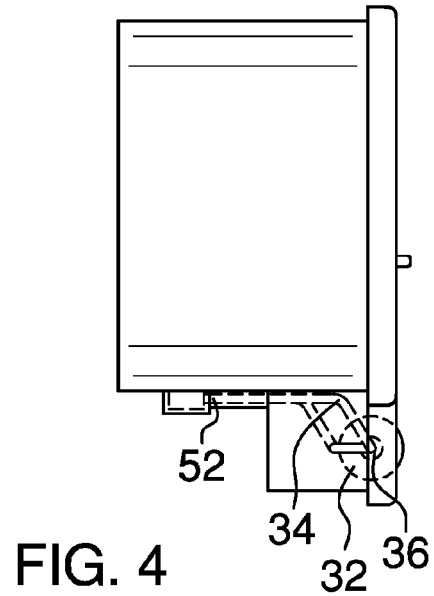
FIG. 4 is a side elevation view.
Figure 5:
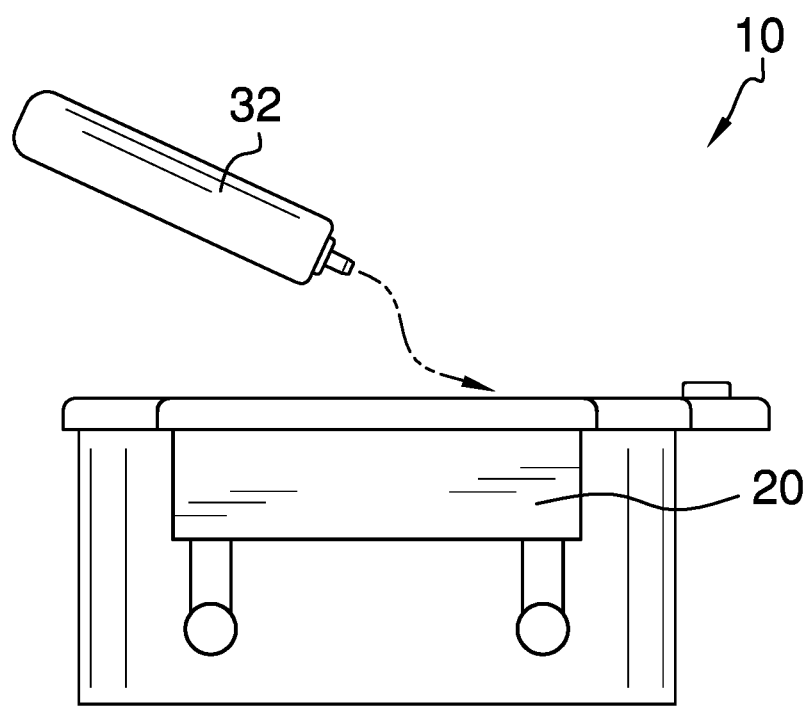
FIG. 5 is a bottom plan view.
Figure 6:
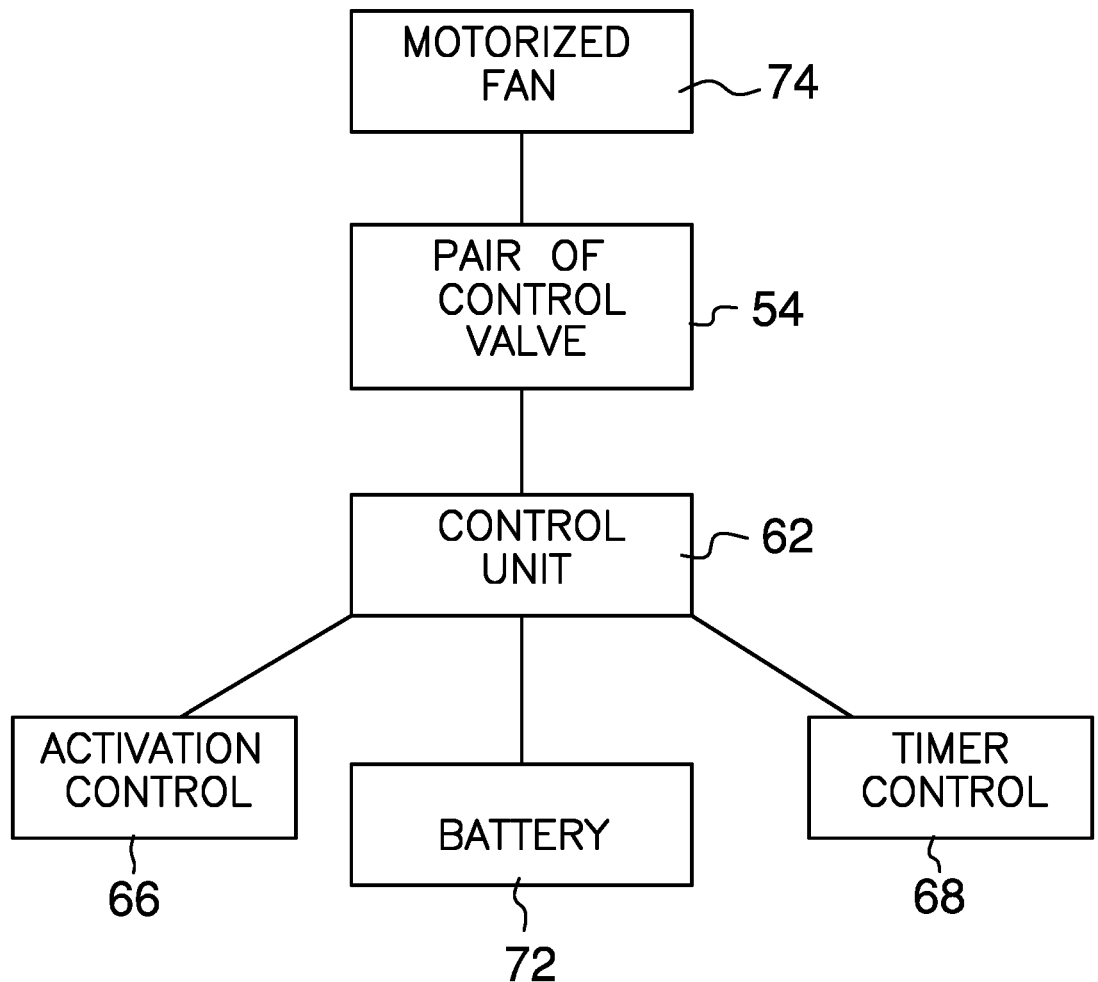
FIG. 6 is a block diagram.

With reference now to the drawings, and in particular FIGS. 1 through 6 thereof, an example of the instant air freshener for an automobile employing the principles and concepts of the present air freshener for an autombile and generally designated by the reference number 10 will be described.

Referring to FIGS. 1 through 6 the present air freshener for an automobile 10 is illustrated. The air freshener for an automobile 10 includes a housing unit 20 attached to an underside 22 of a dashboard air vent of an automobile 24. The housing unit 20 has a back surface 26, a front surface 28, and a rectangular opening 30 disposed in the housing unit 20 from the front surface 28 to proximal the back surface 26. A canister 32 is removably disposed within the opening 30 of the housing unit 20, and an outlet tube 34 has a first end 36 in fluid communication with the canister 32. A pair of apertures 38 includes a right aperture 40 and a left aperture 42. Each of the right aperture 40 and the left aperture 42 is disposed through a bottom surface 44 of the dashboard air vent 24 proximal a right side 46 of the dashboard air vent 24 and a left side 48 of the dashboard air vent 24, respectively. Each of the right aperture 40 and the left aperture 42 is in fluid communication with a second end 50 of the outlet tube 34 and a third end 52 of the outlet tube 34, respectively. A pair of control valves 54 includes a right control valve 56 and a left control valve 58. Each of the right control valve 56 and the left control valve 58 is in operational communication with an actuator 60 and disposed on the second end 50 of the outlet tube 34 and the third end 52 of the outlet tube 34, respectively.

The air freshener for an automobile 10 further includes a control unit 62 attached to a continuous front edge 64 of the dashboard air vent of the automobile 24. The control unit 62 has an activation control 66, a timer control 68, and a battery compartment 70 having a battery 72 removably disposed within the battery compartment 70. The activation control 66 is configured to activate the pair of control valves 54 to release a quantity of liquid in the canister 32 through each of the pair of apertures 38. The timer control 68 is configured to activate the pair of control valves 54 at one of a plurality of time intervals selected by a user. The pair of control valves 54, the control unit 62, the activation control 66, the timer control 68, and the battery 72 are in operational communication with each other.

The air freshener for an automobile 10 optionally includes a motorized fan 74 disposed within the dashboard air vent 24 proximal the pair of apertures 38. The motorized fan 74 is in operational communication with the control unit 62, the activation control 66, the timer control 68, and the battery 72. The motorized fan 74 is configured to activate when the pair of control valves 54 is activated by one of the activation control 66 and the timer control 68.

What is claimed is:

1. An air freshener for an automobile comprising:
   a housing unit attached to an underside of a dashboard air vent of an automobile, the housing unit having a back surface, a front surface, and a rectangular opening disposed in the housing unit from the front surface to proximal the back surface;
   a canister removably disposed within the housing unit opening,
   an outlet tube having a first end in fluid communication with the canister;
   a pair of apertures comprising a right aperture and a left aperture, each of the right aperture and the left aperture disposed through a bottom surface of the dashboard air vent proximal a right side of the dashboard air vent and a left side of the dashboard air vent, respectively, wherein each of the right aperture and the left aperture is in fluid communication with a second end of the outlet tube and a third end of the outlet tube, respectively;
   a pair of control valves comprising a right control valve and a left control valve, each of the right control valve and the left control valve in operational communication with an actuator and disposed on the outlet tube second end and the outlet tube third end, respectively; and
   a control unit attached to a continuous front edge of the dashboard air vent of the automobile, the control unit having an activation control, a timer control, and a battery compartment having a battery removably disposed within the battery compartment;
   wherein the activation control is configured to activate the pair of control valves to release a quantity of liquid in the canister through each of the pair of apertures;
   wherein the timer control is configured to activate the pair of control valves at one of a plurality of time intervals selected by a user;
   wherein the pair of control valves, the control unit, the activation control, the timer control, and the battery are in operational communication with each other.

2. The air freshener for an automobile of claim 1 further comprising a motorized fan disposed within the dashboard air vent proximal the pair of apertures, the motorized fan in operational communication with the control unit, the activation control, the timer control, and the battery, wherein the motorized fan is configured to activate when the pair of control valves is activated by one of the activation control and the timer control.

* * * * *